(12) United States Patent
Takei

(10) Patent No.: US 8,034,473 B2
(45) Date of Patent: Oct. 11, 2011

(54) STORAGE BATTERY AIR-COOLING DEVICE

(75) Inventor: Toshihiro Takei, Saitama (JP)

(73) Assignee: Calsonic Kansei Corporation, Saitama (JP)

(*) Notice: Subject to any disclaimer, the term of this patent is extended or adjusted under 35 U.S.C. 154(b) by 28 days.

(21) Appl. No.: 12/451,419

(22) PCT Filed: May 7, 2008

(86) PCT No.: PCT/JP2008/058496
§ 371 (c)(1),
(2), (4) Date: Nov. 12, 2009

(87) PCT Pub. No.: WO2008/140002
PCT Pub. Date: Nov. 20, 2008

(65) Prior Publication Data
US 2010/0092852 A1     Apr. 15, 2010

(30) Foreign Application Priority Data
May 14, 2007   (JP) .................................. 2007-128358

(51) Int. Cl.
*H01M 10/50*     (2006.01)
*B60K 11/06*     (2006.01)
*B60K 1/04*      (2006.01)
*B60K 6/28*      (2007.01)
*B60L 3/00*      (2006.01)

(52) U.S. Cl. ......... 429/120; 429/96; 180/68.1; 180/68.5

(58) Field of Classification Search ................... 429/120, 429/96–100; 180/68.1, 68.5
See application file for complete search history.

(56) References Cited

U.S. PATENT DOCUMENTS
2004/0062955 A1 * 4/2004 Kubota et al. ..................... 429/9

FOREIGN PATENT DOCUMENTS

| JP | 2000-323185 | 11/2000 |
|----|-------------|---------|
| JP | 2002-166728 | 6/2002 |
| JP | 2004-146237 | 5/2004 |
| JP | 2004-220799 | 8/2004 |
| JP | 2007-112338 | 5/2007 |
| JP | 2007-323810 | 12/2007 |
| WO | 2007/046539 | 4/2007 |

OTHER PUBLICATIONS

International Search Report issued Jun. 3, 2008 in International (PCT) Application No. PCT/JP2008/058496.

* cited by examiner

*Primary Examiner* — Gregg Cantelmo
(74) *Attorney, Agent, or Firm* — Wenderoth, Lind & Ponack, L.L.P.

(57) ABSTRACT

A storage battery air-cooling device cools down, by forced air circulation, a heat generation of a storage battery mounted in a vehicle as a driving power source of the vehicle. The device includes a battery case containing the storage battery with a marginal space on an outer circumference; a cool box which can be placed and extracted from a vehicle cabin for refrigerating an object; a pair of ducts communicating a case chamber of the battery case with a box chamber of the cool box to form a closed air circulation path; and a fan being set in a halfway position of the closed air circulation path to drive to forcedly circulate air in the path.

6 Claims, 2 Drawing Sheets

STORAGE BATTERY AIR-COOLING DEVICE

TECHNICAL FIELD

The present invention relates to a storage battery air-cooling device which cools down, by forced air circulation, a heat generation of a storage battery mounted in a vehicle as a power source for driving the vehicle.

BACKGROUND ART

In the prior art, a known storage battery air-cooling device which cools down a heat generation of a storage battery (battery) mounted in a hybrid car or the like by forced air circulation is configured to supply air with a fan to around the storage battery from either a vehicle cabin or outside of a vehicle and discharge the air having cooled the storage battery to the outside of the vehicle (for example, see Patent Document 1).
Patent Document 1: Japanese Laid-open Patent Publication No. 2002-166728

However, the prior art storage battery air-cooling device holds the following problems because of its structure of taking in cooling air from a vehicle cabin or outside of a vehicle and discharging the air to the outside after cooling.
(1) The prior art storage battery air-cooling device needs to include a filter to prevent foreign particles from entering, particularly when introducing air from the outside, since it is configured to take in the cooling air from the vehicle cabin or outside of the vehicle.
(2) The structure of discharging air to outside may bring a limitation to a vehicle layout such as the height of an air discharge aperature or a duct structure in view of preventing incursion of water especially in such an occasion that the vehicle is flooded.
(3) The fan makes noises in introducing air from the vehicle cabin, which may reach near an air intake and impair comfort of occupants.
(4) If the temperature of intake air is too high to satisfy the necessary cooling amount of the storage battery, the fan's air blowing amount needs be increased, which may result in increased noises along with an increased blowing amount and impaired comfort of occupants.

In view of solving the above problems, the present invention aims to provide a storage battery air-cooling device which can effectively reduce heat generation of a storage battery by forced air circulation, avoid entry of foreign particles, increase the degree of vehicle layout freedom, and reduce noises.

SUMMARY OF THE INVENTION

In view of achieving the above object, a storage battery air-cooling device according to the present invention cools down, by forced air circulation, a heat generation of a storage battery mounted in a vehicle as a driving power source of the vehicle. The device comprises a battery case containing the storage battery with a marginal space on an outer circumference; a cool box which can be placed in and extracted from a vehicle cabin for refrigerating an object; a pair of ducts communicating a case chamber of the battery case with a box chamber of the cool box to form a closed air circulation path; and a fan being set in a halfway position of the closed air circulation path to drive to forcedly circulate air in the path.

ADVANTAGEOUS EFFECT OF THE INVENTION

The storage battery air-cooling device according to the present invention is configured to form the closed air circulation path to complete the air flow between the battery case and the cool box by forced air circulation with the fan. This makes it possible to circulate cooled air in the cool box to effectively reduce a heat generation of the storage battery. Moreover, with the formation of the closed air circulation path, entry of the foreign particles is avoided. Without the air intake and discharge aperature taken into consideration, the degree of vehicle layout freedom can be increased. Further, with the air circulation in the closed space, the amount of blowing air noises can be reduced. As a result, the storage battery air-cooling device can effectively reduce the heat generation of a storage battery by forced air circulation, avoid entry of foreign particles, increase the degree of vehicle layout freedom, and reduce noises.

DESCRIPTION OF NUMERIC CODES

Figure 1:
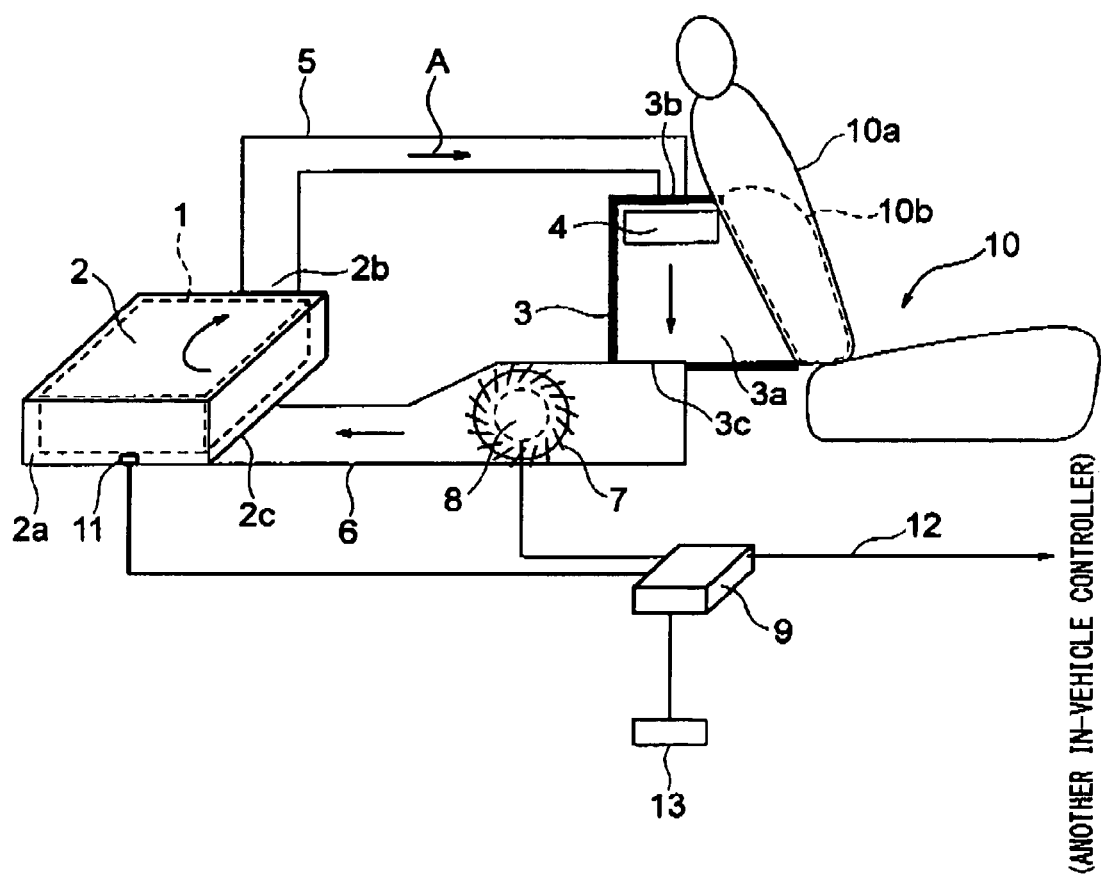
FIG. 1 shows a total system of a storage battery air-cooling device according to a first embodiment.

1 storage battery
2 battery case
2a case chamber
2b first cool air opening
2c second cool air opening
3 cool box
3a box chamber
3b first cool air opening
3c second cool air opening
4 evaporator
5 first cool air circulating duct (duct)
6 second cool air circulating duct (duct)
7 fan
8 fan motor
9 controller
10 back seat
10a seat back pad
10b armrest
11 storage battery thermo sensor
12 CAN communication line
13 cool box switch

DETAILED DESCRIPTION OF THE INVENTION

Hereinafter, the best mode for realizing a storage battery air-cooling device according to the present invention will be described with reference to the accompanying drawings showing a first embodiment.

First Embodiment

First, the structure of the device will be described. FIG. 1 shows the total system of the storage battery air-cooling device according to a first embodiment. The storage battery air-cooling device according to the first embodiment is applied to a hybrid car (as an example of an application) which uses both an engine and a motor generator as a driving power source.

As shown in FIG. 1, the storage battery air-cooling device according to the first embodiment comprises a storage battery 1, a battery case 2, a cool box 3, an evaporator 4, a first cool air circulating duct 5 (duct), a second cool air circulating duct 6 (duct), a fan 7, a fan motor 8, a controller 9, a back seat 10, a storage battery thermo sensor 11, a CAN communication line 12, and a cool box switch 13.

The storage battery 1 is mounted in the hybrid car as electric power source of a not-shown motor generator which is one of driving power sources for the car, and connected with the motor generator via an inverter. The storage battery air-cooling device according to the first embodiment is configured to cool down the heat generation of the storage battery 1 by forced air circulation.

The battery case 2 is a case including a case chamber 2a larger than the storage battery 1 in size and with a marginal gap in the outer circumference to contain the storage battery 1.

The cool box 3 is disposed on the back face of the back seat 10 to contain and refrigerate an object such as a canned drink. This cool box 3 uses, as an opening/closing door, an armrest 10b incorporated in a part of the seat back pad 10a of the back seat 10. That is, the object contained can be put in or taken out with the armrest 10b opened/closed in the vehicle cabin.

The evaporator 4 is incorporated in the cool box 3 to cool down the inside of the box chamber 3a. In the evaporator 4, a coolant generated through the refrigeration cycle of an in-vehicle air conditioner is circulated. Thus, two evaporators as a thermo-adjusting evaporator contained in an air conditioner unit case and an evaporator 4 for the cool box are connected with each other in the refrigeration cycle of the in-vehicle air conditioner.

The first cool air circulating duct 5 communicates a first cool air opening 2b of the battery case 2 with a first cool air opening 3b of the cool box 3. The second cool air circulating duct 6 communicates a second cool air opening 3c of the cool box 3 with a second cool air opening 2c of the battery case 2. That is, a closed air circulation path is formed by the pair of ducts 5,6 allowing the case chamber 2a of the battery case 2 to communicate with the box chamber 3a of the cool box 3.

A fan 7 is set in a halfway position of the closed air circulation path to be driven by the fan motor 8 to forcedly circulate air in the path. According to the first embodiment, the fan 7 is provided in a halfway position of the second cool air circulating duct 6 to perform both of a cooling air fan function to cool down storage battery 1 and a blowing fan function during operation of the cool box 3.

The controller 9 controls driving of the fan motor 8. It drives the fan motor 8 when at least one of an exothermal temperature condition in which a temperature of the storage battery 1 exceeds an air cooling start threshold, an exothermal prognostic condition in which the storage battery is expected to generate heat due to charge and discharge, and a cooling request condition in which a cooling operation of the cool box 3 is requested is satisfied.

The storage battery thermo sensor 11 is set inside the battery case 2 to output thermal information on the storage battery 1 to the controller 9.

The CAN communication line 12 is a communication line to another in-vehicle controller (hybrid controller or the like for example) to exchange information through mutual communication. The controller 9 receives, via the CAN communication line 12, battery capacity information of the storage battery 1, information on driving load (on acceleration, deceleration, breaking or else) requiring a sudden electric charge and discharge as exothermal prognostic information of the storage battery 1.

The cool box switch 13 is a switch to be turned on to request a cooling operation of the cool box 3 and turned off to request a stop of the cooling operation of the cool box 3.

Next, the reason for why the present invention is made will be described.

A vehicle such as an electric car or a hybrid car incorporates a storage battery for driving (large battery), and a sudden discharge or charge of the storage battery causes heat of reaction due to a chemical reaction in the storage battery and heat due to electrical internal resistance. Performance of the storage battery deteriorates when the temperature thereof exceeds a predetermined value due to the heat generation. To prevent this from happening, a proper storage battery cooling device is needed.

Such a storage battery is generally installed in a space not to overlap occupants space such as in the trunk, under the floor of the vehicle cabin, or under the interior panel. Since the storage battery is susceptible to water or dust, it is often cooled down by air from an electric fan.

For air cooling, ducts are needed in addition to the fan, which occupy not a small part of the vehicle in terms of volume. Also, there is always a possibility that noise from the driving fun enters the vehicle cabin and impairs the comfort of occupants. Therefore, reducing both the occupied space and noise of the storage battery cooling device to a minimum is a very important factor for improving commercial value of a vehicle.

The inventor of the present invention has focused on effective use of an in-vehicle cool box for a part of the storage battery cooling device, in response to a demand for reducing both the occupied space and noise to a minimum. He has adopted a structure to form a closed air circulation path between the battery case and the cool box in which an air flow is completed. Due to having such a structure, the present invention can achieve the important factor of improving the commercial value of a vehicle as avoidance of entry of foreign particles, increase in the degree of vehicle layout freedom, and noise reduction in addition to realizing an intrinsic air cooling function to reduce heat generation of the storage battery.

Next, functions of the device will be described.

In the following description, the functions of the storage battery air-cooling device according to the first embodiment will be divided into a storage battery forced air cooling function, foreign particles entry avoiding function, layout freedom increasing function, noise reduction function, fan's double function, and reliable refrigeration cycle attaining function, and described one by one.

[Storage Battery Enforced Air Cooling Function]

The controller 9 controlling driving of the fan motor 8 drives the fan motor 8 when at least one of an exothermal temperature condition in which a temperature of the storage battery 1 exceeds an air cooling start threshold, an exothermal prognostic condition in which the storage battery is expected to generate heat due to charge and discharge and a cooling request condition in which a cooling operation of the cool box 3 is requested is satisfied.

When the fan 7 in the second cool air circulating duct 6 is operated by a driving fan motor 8, cooled air having passed through the evaporator 4 is absorbed into an intake side of the fan 7 via the box chamber 3a and the second cool air opening 3c of the cool box 3. The absorbed cooled air with the fan 7 is introduced into the case chamber 2a from a discharge side of the fan in the second cool air circulating duct 6 via the second cooling opening 2c of the battery case 2. In the case chamber 2a, the cooled air is flowed along the outer circumference of the storage battery 1 and removes the heat of the storage battery 1. Then, the air warmed by absorbing the heat of the storage battery 1 passes through the first cool air circulating duct 5 from the first cool air opening 2b of the battery case 2, and is guided to the first cool air opening 3b of the cool box 3 and returned to the evaporator 4 in the cool box 3.

Therefore, the cooling effect to the storage battery 1 can be improved by circulating the cooled air in the cool box 3 in the closed path in the A direction shown in FIG. 1, compared with a prior art device which cools down the storage battery by taking in ambient air or inside air. In other words, in the storage battery air-cooling device according to the first embodiment, the amount of blowing air of the fan 7 needed to acquire the same cooling effect can be smaller than that in the prior art device.

In the first embodiment, the cool air circulation direction is set to the A direction shown in FIG. 1. This directly brings the cooled air in the evaporator 4 into the cool box 3, cooling drinks or the like in the cool box 3 very well. That is, the storage battery 1 is cooled down after the cool box 3. However, this does not affect the cooling effect to the storage battery 1 since the cool box 3 includes no heat generating element so that the cooled cool box 3 can continuously supply cool air.

Even with the armrest 10b as a door of the cool box 3 open during the cooling down of the storage battery 1, the air in the vehicle cabin is only taken into the closed circulation path and does not affect the cooling effect.

[Foreign Particles Entry Avoiding Function]

The prior art storage battery air-cooling device is required to be provided with a filter to prevent entry of foreign particles, especially in taking in air from outside the vehicle, due to its structure for taking in cooling air from inside the vehicle cabin or outside the vehicle.

To the contrary, the storage battery air-cooling device according to the first embodiment forms the air circulation path in a closed space since the air path to cool down the storage battery 1 is limited to both the ducts 5, 6 connecting both of the battery case 2 and the cool box 3. This can reduce a possibility of allowing foreign particles to enter to a minimum.

Moreover, forming the air path to cool down the storage battery 1 as the air circulation path in a closed space leads to attain such advantages as no filter being needed, lower costs, lower airflow resistance, or no need to consider the positions of the air intake or discharge aperture, compared with taking in air from outside the vehicle.

[Layout Freedom Increasing Function]

The prior art storage battery air-cooling device is configured to discharge air to the outside of the vehicle, which may bring a limitation to a vehicle layout such as a height of an air discharge aperature or a duct structure in view of preventing incursion of water especially in such an occasion that the vehicle is flooded.

Meanwhile, the storage battery air-cooling device according to the first embodiment is configured to have the closed air circulation path formed and can eliminate the necessity to consider the positioning and height of the air intake and discharge aperature. This enables an increase in the layout freedom of the vehicle.

[Noise Reduction Function]

In the prior art storage battery air-cooling device, the noise of the fan for taking in air from the vehicle cabin may reach near the air intake, impairing comfort of occupants.

Further, if the temperature of the intake air is too high to satisfy the necessary cooling amount of the storage battery, the blowing air amount needs be increased, resulting in increasing noises along with the increased blowing air amount and impairing comfort of occupants.

To the contrary, the storage battery air-cooling device according to the first embodiment can reduce noise to a minimum for the following reasons.

Reason 1: Due to the air circulation in the closed space, it is possible to prevent noise from leaking from the closed air circulation path to the outside. This can reduce noise traveling to the vehicle cabin to a minimum and contribute to quietness in the vehicle cabin which makes occupants feel comfortable.

Reason 2: As described above, the amount of blowing air of the fan 7 needed to acquire the same cooling performance can be smaller than that in the prior art device.

[Fan's Double Function]

A vehicle incorporating a cool box requires two more fans for the cool box and the storage battery air-cooling device in addition to a general vehicle air conditioner, which results in reducing an occupants' space or a luggage space.

Meanwhile, the storage battery air-cooling device according to the first embodiment is configured to include the fan 7 in the halfway position of the second cool air circulating duct 6 so that the single fan 7 can perform both the air cooling fan function to cool down the storage battery 1 and the blowing air fan function during operation of the cool box 3. This can lead to satisfying space saving, lower costs, and high reliability.

[Reliable Refrigeration Cycle Attaining Function]

With an evaporator dedicated for the cool box, non-use of the cool box or non-driving of a fan for the cool box may cause coolant to be accumulated inside the evaporator, inducing a negative effect of a shortage of coolant or oil in the refrigeration cycle for vehicle air conditioning.

To the contrary, the storage battery air-cooling device according to the first embodiment is configured so that even during non-use of the cool box 3, the controller 9 controlling driving of the fan motor 8 drives the fan motor 8 when at least one of an exothermal temperature condition in which a temperature of the storage battery 1 exceeds an air cooling start threshold and an exothermal prognostic condition in which the storage battery 1 is expected to generate heat due to charge and discharge is satisfied. This accordingly prevents the coolant or oil from accumulating in the evaporator 4 dedicated to the cool box and helps maintain their proper circulation, making it easier to secure reliability of the refrigeration cycle for the vehicle air conditioning.

Next, effects of the device will be described. The storage battery air-cooling device according to the first embodiment can attain the following effects.

(1) The storage battery air-cooling device which cools down, by forced air circulation, a heat generation of a storage battery 1 mounted in a vehicle as a driving power source of the vehicle, comprises a battery case 2 containing the storage battery 1 with a marginal space on an outer circumference; a cool box 3 which can be placed in and extracted from a vehicle cabin for refrigerating an object; a pair of ducts 5, 6 communicating a case chamber 2a of the battery case 2 with a box chamber 3a of the cool box 3 to form a closed air circulation path; and a fan 7 being set in a halfway position of the closed air circulation path to drive to forcedly circulate air in the path. Therefore, by the forced air circulation, the device can achieve effective reduction of heat generation of the storage battery 1, as well as preventing entry of foreign particles, increasing the degree of vehicle layout freedom, and reducing noises.

(2) The pair of ducts are a first cool air circulating duct 5 which communicates a first cool air opening 2b of the battery case 2 with a first cool air opening 3b of the cool box 3, and a second cool air circulating duct 6 which communicates a second cool air opening 2c of the battery case 2 with a second cool air opening 3c of the cool box 3. The fan 7 is provided in a halfway position of at least one of the first cool air circulating duct 5 and the second cool air circulating duct 6. This accordingly makes it unnecessary to prepare a space to install the fan in the battery case 2 or the cool box 3, and makes it possible to secure smooth circulation of air which cools the storage battery 1 without an increase in sizes of the battery case 2 and cool box 3.

(3) A fan motor 8 driving the fan 7 and a controller 9 controlling driving of the fan motor 8 are provided. The controller 9 is configured to drive the fan motor 8 when at least one of an exothermal temperature condition in which a temperature of the storage battery 1 exceeds an air cooling start threshold and an exothermal prognostic condition in which the storage battery 1 is expected to generate heat due to charge and discharge is satisfied. Therefore, it is possible to certainly prevent the storage battery 1 from rising in temperature to such an extent that lowers battery performance, specifically by performing air cooling control based on expected heat generation.

(4) The quantity of the fan 7 set in a halfway position of the closed air circulation path is one, and the fan includes a double function as an air cooling fan function to cool down the storage battery 1 and a blowing air fan function during operation of the cool box 3. This eliminates the necessity for installing two fans so that space saving, lower costs, and higher reliability are satisfiable.

(5) The cool box 3 includes, as a cooling unit for the box chamber 3a, an evaporator 4 in which a coolant generated from a refrigeration cycle of an in-vehicle air conditioner is circulated. The controller 9 is configured to drive the fan motor 8 when at least one of an exothermal temperature condition in which a temperature of the storage battery 1 exceeds an air cooling start threshold, an exothermal prognostic condition in which the storage battery is expected to generate heat due to charge and discharge and a cooling request condition in which a cooling operation of the cool box 3 is requested is satisfied. This prevents the coolant from accumulating inside the evaporator 4 dedicated to the cool box even during non-use of the cool box, and can easily secure reliability of the refrigeration cycle for the in-vehicle air conditioning.

In the above, although the storage battery air-cooling device according to the present invention has been described in terms of the first embodiment, detailed configuration should not be limited thereto. It should be appreciated that design variations or additions may be made in the embodiment without departing from the scope of the present invention as defined by the following claims.

Figure 2:
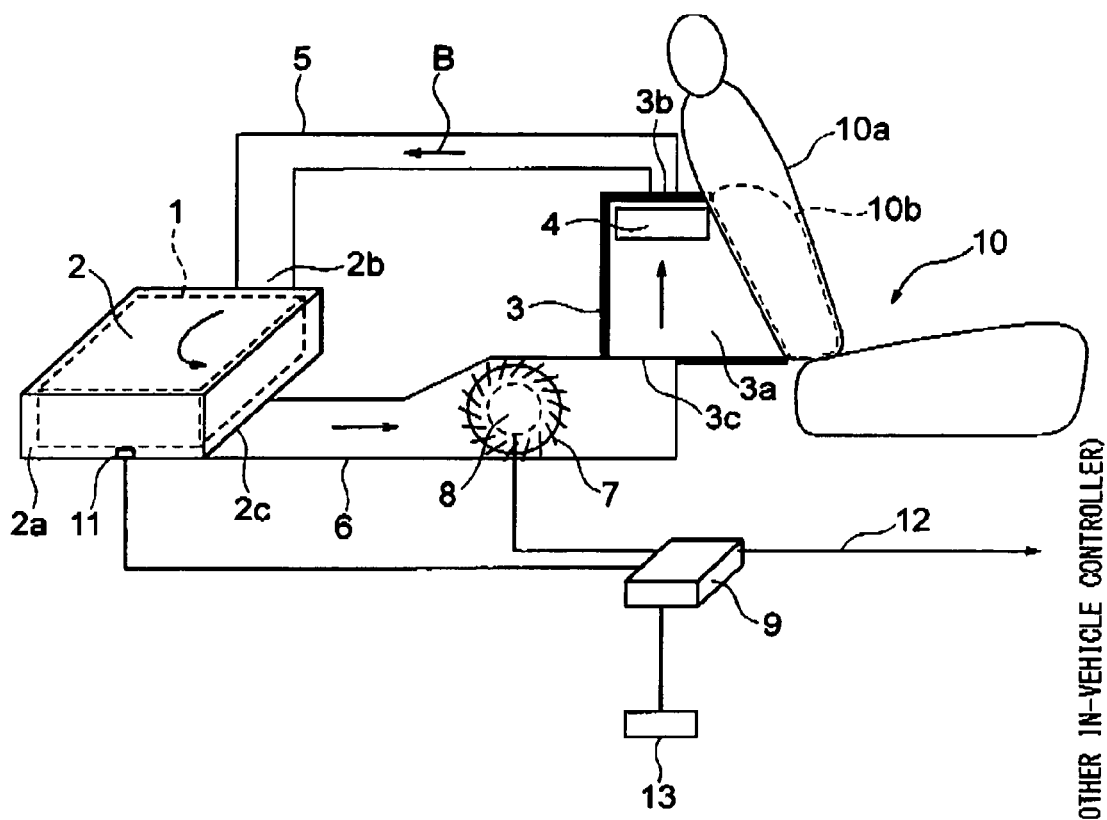
FIG. 2 shows the total system of the storage battery air-cooling device according to the first embodiment in a state in which the direction of cool air circulation is switched to a B direction.

The first embodiment has described a preferable example in which the cool air circulation direction is set to the A direction shown in FIG. 1 to achieve both of the cooling effect to cool drinks or the like in the cool box 3 and the cooling effect to cool the storage battery 1 in the battery case 2. However, the cool air circulation direction can be set to a B direction opposite to the A direction shown in FIG. 2. With the circulation direction being the B direction, drinks or the like in the cool box 3 cannot be sufficiently cooled but the cooled air in the evaporator 4 is directly introduced into the battery case 2 so that the cooling effect to the storage battery 1 is heightened. Accordingly, it can be configured that the cool air circulation direction is controlled to be switched to the B direction when a cooling request for the storage battery 1 is issued but that for the cool box 3 is not, for example.

The first embodiment has described an example in which an evaporator through which coolant generated from the refrigeration cycle of the in-vehicle air conditioner is circulated is used for a cooling unit for the cool box. However, it can be configured to introduce cool air from the in-vehicle air conditioner or cooling drain water. It can also be not just a simple cool box, but a rear air conditioner with a cool box, for example.

In short, detailed structure of the device is not limited to that of the first embodiment as long as it comprises a battery case containing the storage battery with a marginal space on an outer circumference, a cool box being able to be placed and extracted from a vehicle cabin and refrigerating an object, a pair of ducts communicating a case chamber of the battery case with a box chamber of the cool box to form a closed air circulation path, and a fan being set in a halfway position of the closed air circulation path to drive to forcedly circulate air in the path.

INDUSTRIAL AVAILABILITY

The first embodiment has described an example in which the storage battery air-cooling device is applied to a hybrid car using both an engine and a motor generator for a driving power source. However, it can be applied to an electric car or a fuel-cell power car incorporating only either a motor or a motor generator for a driving power source. In short, the present invention is applicable to any storage battery air-cooling device which is configured to cool down, by forced air circulation, a heat generation of a storage battery mounted in a vehicle as a driving power source.

The invention claimed is:

1. A storage battery air-cooling device which cools down, by forced air circulation, a heat generation of a storage battery mounted in a vehicle, the storage battery being a driving power source of the vehicle, comprising:
   a battery case containing the storage battery with a marginal space on an outer circumference;
   a cool box to be placed in and extracted from a vehicle cabin, the cool box being configured for refrigerating an object;
   a pair of ducts connecting a case chamber of the battery case with a box chamber of the cool box to form a closed air circulation path in which the case chamber communicates with the box chamber; and
   a fan set in the closed air circulation path to forcedly circulate air in the path.

2. A storage battery air-cooling device according to claim 1, wherein:
   the pair of ducts comprise a first cool air circulating duct which connects a first cool air opening of the battery case with a first cool air opening of the cool box to allow the first cool air opening of the battery case to communicate with the first cool air opening of the cool box, and a second cool air circulating duct which connects a second cool air opening of the battery case with a second cool air opening of the cool box to allow the second cool air opening of the battery case to communicate with the second cool air opening of the cool box; and
   the fan is provided in a halfway position of at least one of the first cool air circulating duct and the second cool air circulating duct.

3. A storage battery air-cooling device according to claim 1, further comprising:
   a fan motor driving the fan; and
   a controller controlling driving of the fan motor, wherein the controller is configured to drive the fan motor when at least one of an exothermal temperature condition and an exothermal prognostic condition is satisfied, the exothermal temperature condition being a condition in which a temperature of the storage battery exceeds an air cooling start threshold, the exothermal prognostic condition being a condition in which the storage battery is expected to generate heat due to charge and discharge.

4. A storage battery air-cooling device according to claim 1, wherein
only one fan is set in a halfway position of the closed air circulation path, and the fan is arranged and configured to perform an air cooling fan function to cool down the storage battery and to perform a blowing air fan function during operation of the cool box.

5. A storage battery air-cooling device according to claim 4, wherein:
the cool box includes an evaporator in which a coolant generated from a refrigeration cycle of an in-vehicle air conditioner is circulated, the evaporator being arranged and configured to be a cooling unit for the box chamber; and
said storage battery air-cooling device further comprising a controller for driving a fan motor of the fan when at least one of an exothermal temperature condition, an exothermal prognostic condition, and a cooling operating request condition is satisfied, the exothermal temperature condition being a condition in which a temperature of the storage battery exceeds an air cooling start threshold, the exothermal prognostic condition being a condition in which the storage battery is expected to generate heat due to charge and discharge, and the cooling operation request condition being a condition in which a cooling operation of the cool box is requested.

6. A storage battery air-cooling device according to claim 1, wherein the fan is set in a halfway position in the closed air circulation path between the case chamber and the box chamber.

* * * * *